United States Patent
Priest (10) Patent No.: US 6,395,084 B1
(45) Date of Patent: May 28, 2002

(54) PLATELET/FLAKE MAGNESIUM OXIDE, METHODS OF MAKING THE SAME, AND MAGNESIUM OXYCHLORIDE/ OXYSULFATE CERAMIC MATERIALS

(76) Inventor: James L. Priest, 2127 N.Winchester St., Chicago, IL (US) 60614

( * ) Notice: Subject to any disclaimer, the term of this patent is extended or adjusted under 35 U.S.C. 154(b) by 0 days.

(21) Appl. No.: 09/250,373

(22) Filed: Feb. 16, 1999

(51) Int. Cl.⁷ .............................................. G04B 35/03
(52) U.S. Cl. ...................... 106/801; 501/108; 423/635; 423/637; 423/638
(58) Field of Search ................................ 106/801, 685; 501/108; 423/635, 637, 638

(56) References Cited

U.S. PATENT DOCUMENTS

| | | | | |
|---|---|---|---|---|
| 2,219,725 A | | 10/1940 | Seaton | 252/2 |
| 3,508,869 A | | 4/1970 | Shoaff | 23/201 |
| 3,951,885 A | | 4/1976 | Thompson | 260/2.5 AK |
| 4,003,752 A | * | 1/1977 | Isohata et al. | |
| 4,075,311 A | | 2/1978 | Eustacchio | 423/636 |
| 4,141,744 A | | 2/1979 | Prior et al. | 106/105 |
| 4,158,570 A | * | 6/1979 | Irwin | |
| 4,352,694 A | * | 10/1982 | Smith-Johannsen | |
| 5,004,505 A | * | 4/1991 | Alley et al. | 106/685 |
| 5,049,197 A | * | 9/1991 | Brown | 106/685 |
| 5,110,361 A | * | 5/1992 | Alley et al. | 106/685 |
| 5,180,429 A | * | 1/1993 | Khasanov | 106/685 |
| 5,645,637 A | * | 7/1997 | Yaniv | 106/677 |
| 5,647,180 A | | 7/1997 | Billings et al. | 52/268 |
| 5,795,380 A | | 8/1998 | Billings et al. | 106/675 |

FOREIGN PATENT DOCUMENTS

| | | | |
|---|---|---|---|
| AT | 340366 | | 12/1977 |
| CN | 1137501 | * | 12/1995 |
| CN | 1225345 | * | 8/1999 |
| CN | 1229068 | * | 9/1999 |
| CN | 1239083 | * | 12/1999 |
| DE | 388357 | | 1/1924 |
| EP | 0 454 660 A1 | | 10/1991 |
| FR | 2 622 570 A | | 5/1989 |
| GB | 2227246 A | | 7/1990 |
| JP | 1982-26993 E | | 7/1980 |
| JP | 57188441 | * | 11/1982 |
| JP | 07223856 | * | 8/1995 |
| JP | 09227185 | * | 9/1997 |

OTHER PUBLICATIONS

Kirk–Othmer Encyclopedia of Chemical Technology, 4th ed., vol. 15, pp. 703–707 (1995).

* cited by examiner

Primary Examiner—Paul Marcantoni
(74) Attorney, Agent, or Firm—Marshall, Gerstein & Borun (57) ABSTRACT

Magnesium oxychloride and magnesium oxysulfate materials and methods of making the same are disclosed. The materials are cured reaction products of a magnesium oxide, and an aqueous magnesium salt solution. The aqueous salt solution preferably has a specific gravity of about 1.18 to about 1.4. The magnesium oxide has a platelet or flake structure, a bulk density of about 30 lbs/ft³ (about 0.48 g/cm³) to about 70 lbs/ft³ (about 1.12 g/cm³), and a particle density of about 215 lbs/ft³ (about 3.45 g/cm³) or less. The platelet/flake magnesium oxide is prepared, preferably from particles of magnesium oxide ore or brucite ore, using brine-free methods.

30 Claims, 2 Drawing Sheets

PLATELET/FLAKE MAGNESIUM OXIDE, METHODS OF MAKING THE SAME, AND MAGNESIUM OXYCHLORIDE/OXYSULFATE CERAMIC MATERIALS

BACKGROUND OF THE INVENTION

1. Field of the Invention

The invention generally relates to platelet/flake magnesium oxide, uses, and methods of making the same. One such use relates to water-insoluble ceramic materials made from the platelet/flake magnesium oxide.

2. Brief Description of Related Technology

There is no direct affinity between magnesium oxide (MgO) and magnesium salts. However, in the presence of water a chemical bond forms between magnesium oxide and magnesium salts (e.g., magnesium chloride or magnesium sulfate) to form a slurry which cures to a ceramic material (e.g., magnesium oxychloride or magnesium oxysulfate). Magnesium oxychloride and magnesium oxysulfate ceramic materials are particularly desirable for use as cements because they exhibit excellent strength characteristics and excellent fire-retardant properties. Furthermore, such materials, when reinforced with glass fibers may be used to produce fire-retardant molded articles, such as automotive parts and building panels.

One method of making magnesium oxychloride and oxysulfate cements is described in U.S. Pat. No. 4,158,570, the disclosure of which is hereby incorporated herein by reference. The '570 patent teaches that magnesium oxychloride and oxysulfate cements are prepared by mixing magnesium oxide (also referred to as magnesia) with concentrated aqueous solutions of magnesium chloride and magnesium sulfate, respectively, typically while employing high shear mixing conditions.

According to the '570 patent (column 2, lines 6–10), a hydrated magnesium chloride ($MgCl_2.6H_2O$) solution typically contains 60 percent by weight (wt. %) to 85 wt. % solids, whereas, a hydrated magnesium sulfate ($MgSO_4.7H_2O$) solution typically contains 50 wt. % to 75 wt. % solids. However, magnesium chloride solutions having a specific gravity of above 28° Baumé (corresponding to a $MgCl_2.6H_2O$ solids concentration of about 59 wt. %), and magnesium sulfate solutions having a specific gravity of above 34° Baumé (corresponding to a $MgSO_4.7H_2O$ solids concentration of about 48 wt. %) are discouraged because the formed slurry would have an undesirably high viscosity and would be difficult to cast and/or mold. See ASTM A88.2-1952, for example. The magnesium oxychloride and oxysulfate materials made in accordance with these teachings, however, exhibit physical characteristics, described below, which could be improved upon.

The specific gravity of a solution may be calculated on the Baumé (Be) scale, expressed in degrees, by the following formula:

$$Be = m - (m/s)$$

wherein m is 145 for liquids heavier than water, and m is 140 for liquids lighter than water, and s is the specific gravity. Hence, 28° Baume corresponds to a specific gravity of about 1.25, and 34° Baumé corresponds to a specific gravity of about 1.4.

Generally, water should not be combined with a magnesium oxide prior to adding a magnesium salt because the oxide will undesirably hydrate to magnesium hydroxide ($Mg(OH)_2$). Magnesium hydroxide is insoluble in water and does not combine readily with magnesium salts to form the desired cementitious material. Thus, the magnesium oxide should be admixed with an aqueous magnesium salt solution. Accordingly, the '570 patent teaches that the aqueous magnesium chloride solution used to make a magnesium oxychloride cement is prepared by mixing hydrous magnesium chloride with water, phosphoric acid ($H_3PO_4$), and sodium hexametaphosphate (($NaPO_3)_6$). The magnesium oxide is then added to the formed solution in a molar ratio of about 3:1 to about 8:1 to result in a slurry or paste-like material which, when cured (i.e., set and molded to a desired shape), produces a magnesium oxychloride (($MgO.MgCl_2.6H_2O$)) material.

Similarly, the aqueous magnesium sulfate solution used in the manufacture of the magnesium oxysulfate cement is prepared by mixing magnesium sulfate with water, phosphoric acid ($H_3PO_4$) and sodium hexametaphosphate (($NaPO_3)_6$). The magnesium oxide is then added to the solution in a molar ratio of about 3:1 to about 14:1 to result in a slurry or paste-like material which, when cured, produces a magnesium oxysulfate (($5MgO.MgSO_4.H_2O$)) material. Curing, in either case, can occur at room temperature or at elevated temperatures.

The '570 patent further teaches the importance of using high shear blending to bring about and ensure a de-agglomeration and de-flocculation of the magnesium oxide particles and to more evenly disperse the magnesium oxide throughout the magnesium salt solutions (chloride or sulfate). The '570 patent warns that if high shear mixing is not employed during the blending step, the resultant cured materials will not possess the necessary water insoluble characteristic and will have other undesirable physical and structural characteristics.

High shear mixing, however, imparts heat (i.e., temperatures of about 130° F. (about 54° C.)) to the oxide/salt mixture which can cause premature cure of the cementitious mixture. In order to avoid such premature cure, the '570 patent teaches to admix the magnesium oxide with the magnesium salt solution in a controlled, stage-wise manner, wherein a first portion of the magnesium oxide initially is added to the solution under low shear mixing conditions and thereafter, a second portion and additional portions (e.g., the remainder) are successively admixed with increasingly high shear mixing until all of the oxide has been added.

Generally, the magnesium oxide used to prepare the cement is conventionally manufactured by thermal decomposition or chemical reaction of various magnesium compounds such as, for example, magnesite ore (e.g., magnesium carbonate ($MgCO_3$)), magnesium hydroxide, and magnesium chloride. One such method, practiced by Martin Marietta Magnesia Specialists, Inc., at its Woodville, Ohio plant, generally includes calcining dolomitic limestone (($CaMg(CO_3)_2$)) at high temperature to produce calcined dolomite (($CaO.MgO$)) or dolime, which reacts with a magnesium chloride-rich brine ($CaCl_2.MgCl_2.H_2O$) solution to produce a slurry having solid particles of insoluble magnesium hydroxide ($Mg(OH)_2$) and a liquid phase of calcium chloride ($CaCl_2$). The solid magnesium hydroxide then is separated from the liquid calcium chloride carrier and further calcined to form a various grades of magnesium oxide, such as reactive, light-burned magnesium oxide to unreactive, dead-burned magnesium oxide.

Other prevalent methods of manufacturing such conventional magnesium oxides, including seawater methods, generally are described in Jackson, L. C. et al., "Magnesium Compounds" in: *Encyclopedia of Chemical Technology*. Vol. 15, pp. 675–722 (1995), the disclosure of which is hereby incorporated herein by reference.

At a microscopic level, the formed conventional magnesium oxide is a solid having a spherical shape, generally. When this magnesium oxide is mixed with a high specific gravity solution, such as a magnesium salt solution, the solution fills interstitial voids or spaces present between closely packed magnesium oxide spheres. The heat imparted to the solution during the mixing step(s) causes the solution to expand and, thereby, fracture the spherical particles before the desired cement-forming reaction between the magnesium oxide and salt is complete. Hence, the magnesium oxide never fully dissolves into the solution. The undissolved magnesium oxide has a natural tendency to hydrate to an insoluble magnesium hydroxide when the salt/oxide material is eventually exposed to water. Additionally, conventional magnesium oxychloride cements hydrolyze to produce free magnesium chloride ($MgCl_2$) which is highly corrosive. The presence of magnesium hydroxide and free magnesium chloride results in a structurally inferior material having fair to poor physical characteristics when compared to non-ceramic based cements.

To improve the physical characteristics and structural integrity of ceramic-based cements, the prior art has suggested the addition of various additives, such as water-soluble phosphates. For example, the '570 patent teaches that the presence of polyphosphates, such as sodium hexametaphosphate, prevents the magnesium salt from undesirably precipitating when the solution is cooled to temperatures less than ambient. Additionally, use of phosphate additives improves the wet strength of the formed cement, and reduces material contraction often experienced during the curing step. Despite the use of phosphate additives, however, the formed cement exhibits low dry strength and low wet strength characteristics, and undesirably hydrates to magnesium hydroxide when exposed to water.

In view of the foregoing, it would be desirable to provide a magnesium oxychloride or magnesium oxysulfate ceramic material which when, exposed to water or other environmental conditions (e.g., high concentrations of ozone), does not result in the undesirable formation of water-insoluble magnesium hydroxide and/or the corrosive magnesium chloride. Furthermore, it would be desirable to provide a magnesium oxide-based ceramic material free of one or more prior art additives (e.g., phosphates). Additionally, it would be desirable to provide a magnesium oxychloride or magnesium oxysulfate ceramic material having superior physical characteristics and superior structural integrity compared to conventional magnesium oxychloride or oxysulfate ceramic materials.

SUMMARY OF THE INVENTION

It is an objective of the invention to overcome one or more of the problems described above.

Accordingly, the invention provides a ceramic material, and a method of making the same, comprising a reaction product of (a) a magnesium oxide having a platelet or flake structure (hereinafter "platelet/flake"), a bulk density of about 30 pounds per cubic foot (lbs/ft$^3$) (about 0.48 grams per cubic centimeter (g/cm$^3$)) to about 70 lbs/ft$^3$ (about 1.12 g/cm$^3$), and a particle density of about 215 lbs/ft$^3$ (about 3.45 g/cm$^3$) or less, and (b) an aqueous solution comprising a magnesium salt selected from the group consisting of magnesium chloride, magnesium sulfate, and mixtures thereof, wherein the magnesium salt solution has a specific gravity of about 1.18 to about 1.4.

The platelet/flake magnesium oxide used to make the ceramic material can be prepared from a magnesium oxide ore or from a brucite ore, for example. The platelet/flake magnesium oxide can be prepared from magnesium oxide ore particles, preferably having a particle size of about ¼ inch to about five inches, by heating the particles at a temperature and for a time period sufficient to remove contaminants therefrom. Thereafter, the particles are re-hydrated with water and then heated to vaporize the water resulting in expanded ore particles having a hollow shaped structure. The hollow shaped structures then are ground to produce the platelet/flake magnesium oxide.

Alternatively, the platelet/flake magnesium oxide can be prepared from brucite ore particles, preferably having a particle size of about ¼ inch to about five inches, by heating the particles at a temperature and for a time period sufficient to convert the brucite to magnesium oxide and to remove contaminants therefrom. Thereafter, the converted, magnesium oxide particles are heated to vaporize water present in the particles resulting in expanded magnesium oxide particles having a hollow shaped structure. The hollow shaped structures then are ground to produce the platelet/flake magnesium oxide.

Regardless of the particular starting material, a platelet/flake magnesium oxide can be prepared by a method that includes the steps of heating high-purity magnesium oxide particles to vaporize water present in the particles, resulting in expanded particles having a hollow shaped structure, and shaping the hollow shaped structure to produce the platelet/flake magnesium oxide.

Further objects and advantages of the invention may become apparent to those skilled in the art from a review of the following detailed description, taken in conjunction with the examples, the drawing figures, and the appended claims.

BRIEF DESCRIPTION OF THE DRAWINGS

For a complete understanding of the invention reference should be made to the following detailed description and accompanying drawings wherein.

DETAILED DESCRIPTION OF THE INVENTION

The invention is directed to a magnesium oxide having a platelet or flake structure, a bulk density of about 30 lbs/ft$^3$ (about 0.48 g/cm$^3$) to about 70 lbs/ft$^3$ (about 1.12 g/cm$^3$), and a particle density of about 215 lbs/ft$^3$ (about 3.45 g/cm$^3$) or less, methods of making the magnesium oxide, and a ceramic material made by reacting the inventive magnesium oxide and an aqueous solution comprising a magnesium salt selected from the group consisting of magnesium chloride, magnesium sulfate, or mixtures thereof, wherein the magnesium salt solution has a specific gravity of about 1.18 to about 1.4. The ceramic material is made by admixing the magnesium oxide with the aqueous magnesium salt solution to form a slurry and, thereafter, curing the slurry to form the ceramic material.

The inventive platelet/flake magnesium oxide has different physical properties (as described below) and can be prepared from magnesium oxide ores and/or naturally-occurring deposits of brucite ore ($Mg(OH)_2$), for example. The brucite ore contains chemically-locked water molecules and is mined from rare deposits generally found in the United States, Italy, and southeastern Asian nations, such as China, Malaysia, and Thailand, and in Mongolia and Siberia. The magnesium oxide ore also has chemically-locked water molecules and is mined from rare deposits located in southeast Asia, namely China, Malaysia, and Thailand, and in Mongolia and Siberia. The magnesium oxide ore typically is a high-purity ore having a magnesium oxide purity of at least about 50%, preferably at least about 60%, more preferably at least about 70%, and most preferably at least about 90%. The magnesium oxide ore may contain up to about 15% magnesium carbonate ($MgCO_3$) and preferably less than about 10%.

The platelet/flake magnesium oxide is prepared by any of various methods, none of which employ the high-temperature brining step typical of conventional processes. The methods vary depending upon whether the starting material is magnesium oxide ore or brucite ore, however, the methods do share some common steps, as will be apparent. According to the methods, the starting material should be crushed or ground to a preferred particle size, typically about ¼ inches (about 0.635 centimeters (cm)) to about five inches (about 12.7 cm).

When a magnesium oxide ore (having chemically-locked water molecules) is the starting material for the preparation of the subject magnesium oxide, the ore typically is acquired in the form of a large block. This ore block can be crushed or ground to a preferred particle size, typically about ¼ inch (about 0.635 cm) to about five inches (about 12.7 cm). The ore block, however, is extremely hard and, therefore, difficult to crush to sizes of about 1½ inches or less using conventional grinders. Thus, an alternative method of achieving the desired particle size may be utilized wherein a block of the ore may be heated in an oven at a temperature slightly below the melting point of the ore. In so heating the ore block in this manner, the block begins to disintegrate leaving small particles. Particles satisfying the preferred size criteria of about ¼ inch (about 0.635 cm) to about five inches (about 12.7 cm) then can be selected for processing.

After acquiring the desired size ore particles, the particles are heated in an oven to a temperature at or slightly below the melting point of the ore, such as a temperature of about 1500° F. (about 815° C.) to about 1700° F. (about 926° C.), preferably about 1645° F. (about 896° C.) to about 1660° F. (about 904° C.), and most preferably about 1652° F. (about 900° C.). This heating step is used to drive off most of the undesirable contaminants present in the ore, preferably to result in a magnesium oxide content of at least about 85 wt. %., and highly preferably about 90 wt. % to about 100 wt. %. Such contaminants include, but are not limited to, magnesium carbonate ($MgCO_3$), carbon dioxide ($CO_2$), and hydroxide (—OH), for example. The time period of heating is dependent upon a variety of factors including, but not limited to, size of the crushed ore material and the reactivity desired of the finished platelet/flake magnesium oxide product. Typically, the heating period ranges from about four hours to about ten hours.

As a result of the heating step(s), much of the chemically-locked water present in the ore is evaporated. A water is sprayed onto the surface of the small, substantially contaminant-free ore particles to re-hydrate the ore. Thereafter, the ores are heated to produce a platelet/flake magnesium oxide. The heat vaporizes the water which causes the ore to expand and form hollow shaped structures. The result of the expansion step is akin to popping corn kernels to make popcorn—prior to popping (expansion) the kernel is a small dense particle whereas after popping (expansion), the kernel is transformed into a less dense material having high surface area. The high-surface area, low particle density material then can be shaped to produce a flake or platelet structure suitable for use in the invention. By "shaped" or "shaping" it is meant that the material is ground, fractured, disintegrated by air blowing techniques, or a combination of grinding, fracturing, and disintegrating the material into small particles.

Where brucite ($Mg(OH)_2$) is the starting material for the preparation of the subject magnesium oxide, the brucite may contain trace amounts of magnesium carbonate ($MgCO_3$), preferably less than about 10%. As noted above, the brucite ($Mg(OH)_2$) is crushed or ground to a preferred particle size, typically about ¼ inch (about 0.635 cm) to about five inches (about 12.7 cm), more preferably about ¾ inch (about 1.9 cm) to about 1½ inch (about 3.8 cm). Unlike the magnesium oxide ore which is extremely hard and, therefore, difficult to crush, brucite ($Mg(OH)_2$) may be ground to sizes smaller than about 1½ inches using conventional grinders. The crushed brucite ($Mg(OH)_2$) then is heated in an oven to a temperature at or slightly below its melting point, such as a temperature of about 500° F. (260° C.) to about 535° F. (about 280° C.), for a time period in a range of about four hours to about ten hours. This heating step serves to convert the brucite to the magnesium oxide and water according to the following mechanism:

In a subsequent heating step, where the formed material preferably is heated to a temperature of about 572° F. (300° C.) to about 600° F. (about 315° C.), the heat vaporizes the water causing the formed magnesium oxide to expand and form hollow shaped structures. This subsequent heating step is performed for a period of about five minutes to about 30 minutes, preferably about ten minutes to about 20 minutes, and most preferably about 15 minutes. The result of the expansion step is, as previously noted above, akin to popping corn kernels to make popcorn—prior to popping (expansion) the kernel is a small dense particle whereas after popping (expansion), the kernel is transformed into a less dense material having high surface area. The high-surface area, low particle density material then can be shaped to produce a flake or platelet structure suitable for use in the invention.

The platelet/flake magnesium oxide prepared by the foregoing methods from magnesium oxide ore or brucite is especially desirable due to its low particle density and high bulk density which, heretofore, has not been obtainable with magnesium oxides prepared according to conventional methods. The low particle density and high bulk density are attributable to the excellent packing fraction (i.e., high surface area to volume ratio). Additionally, the high surface area leads to a more reactive magnesium oxide.

By "platelet/flake," it is meant that the shape of the magnesium oxide is a thin flattened piece or layer and thin relative to length and width. Furthermore, the magnesium oxide of the invention typically has a large surface area per unit mass. In contrast, conventional magnesium oxide, which is prepared from magnesite ore, magnesium hydroxide, and/or magnesium chloride, for example, does not have a platelet/flake structure but, instead, typically has a spherical shape. The platelet/flake magnesium oxide readily dissolves in a magnesium chloride solution without the addition of heat (which leads to a stronger molecular bond between the magnesium oxide and the magnesium salt). The dissolution does not yield water-insoluble magnesium hydroxide. While not intending to be bound by any particular theory, it is believed that the platelet or flake magnesium oxide structure provides more surface area available for bonding to the magnesium salt solution compared to the conventional magnesium oxide solution—hence a stronger bond can be formed between the salt and oxide. The stronger bonds reduce and/or eliminate the need for conventional additives (e.g., phosphates).

In one embodiment, the platelet/flake magnesium oxide used in the invention is believed to be a composition that includes at least about 85 wt. % magnesium oxide, and preferably about 90 wt. % to about 100 wt. % magnesium oxide based on the total weight of the composition, the balance comprising various contaminants such as, for example, about 0.1 wt. % to about 3.5 wt. % silicon dioxide ($SiO_2$), based on the total weight of the composition; 0.3 wt. % to about 1.5 wt. % ruthenium oxide ($Ru_2O_3$), based on the total weight of the composition; about 0.1 wt. % to about 3.5 wt. % calcium oxide (CaO), based on the total weight of the composition; about 0.1 wt % to about 3 wt. % elemental chlorine ($Cl_2$), based on the total weight of the composition; about 0.4 wt. % to about 2.5 wt. % sulfate (—$SO_4$), based on the total weight of the composition; and 0 wt. % to about 1 wt. % carbonate (—$CO_3$), based on the total weight of the composition.

Furthermore, in an embodiment of the invention, the platelet/flake magnesium oxide has an iodine number of about 15 to about 60, a particle size range of about 0.1 microns to about 0.3 microns, and a crystal size of about 0.02 microns to about 0.035 microns. Generally, however, the magnesium oxide is finely divided (about 0.1 microns to about 100 microns). The particle density of the platelet/flake magnesium oxide is less than about 215 lbs/ft$^3$ (about 3.45 g/cm$^3$), preferably about 170 lbs/ft$^3$ (about 2.7 g/cm$^3$) to about 215 lbs/ft$^3$ (about 3.45 g/cm$^3$), more preferably about 190 lbs/ft$^3$ (about 3.0 g/cm$^3$) to about 205 lbs/ft$^3$ (about 3.3 g/cm$^3$), and most preferably about 195 lbs/ft$^3$ (about 3.1 g/cm$^3$) to about 200 lbs/ft$^3$ (about 3.2 g/cm$^3$). The particle density of the magnesium oxide used in the invention is less than that of conventional magnesium oxide, which typically has a particle density of about 220 lbs/ft$^3$ (about 3.52 g/cm$^3$) as reported by Jackson, L. C. et al., "Magnesium Compounds" in: *Encyclopedia of Chemical Technology*. Vol. 15, p. 704 (1995). The lower particle density of the platelet/flake magnesium oxide results in a bulk density in a range of about 30 lbs/ft$^3$ (about 0.48 g/cm$^3$) to about 70 lbs/ft$^3$ (about 1.12 g/cm$^3$). In contrast, the higher particle density of the conventional magnesium oxide translates into a bulk density of about 20 lbs/ft$^3$ (about 0.32 g/cm$^3$) to about 60 lbs/ft$^3$ (about 0.96 g/cm$^3$). Because the platelet/flake magnesium oxide has a lower particle density it can be more closely-packed to result in a higher bulk density material. As previously noted, this higher bulk density (and lower particle density) material has been found to dissolve more readily in a magnesium salt solution without the addition of heat.

Either an anhydrous or a hydrous magnesium salt may be used in accordance with the invention, however, a hydrous magnesium salt is preferred. Suitable magnesium salts used in the invention include, magnesium chloride, and magnesium sulfate, and mixtures thereof A hydrous magnesium chloride ($MgCl_2.6H_2O$) solution typically contains about 50 percent by weight (wt. %) to about 85 wt. % solids, whereas, a hydrous magnesium sulfate ($MgSO_4.7H_2O$) solution typically contains about 50 percent by weight (wt. %) to about 75 wt. % solids. Preferably, however, a suitable magnesium chloride solution used in the invention includes about 50 wt. % to about 68 wt. % solids based on the weight of the solution. A preferred magnesium sulfate solution used in the invention includes about 50 wt. % to about 68 wt. % solids based on the weight of the solution. The aqueous magnesium salt solution used in the invention preferably has a specific gravity of about 1.18 to about 1.6 (about 54.4° Baume), preferably about 1.18 to about 1.4, and more preferably about 1.22 to about 1.308.

It has been found that the use of the platelet/flake magnesium oxide, having the physical properties described above, in combination with the highly concentrated magnesium salt solutions, prevents the magnesium salt from undesirably precipitating during lengthy storage periods when temperatures are at or below ambient, such as for about 30 days at a temperature of about 0° F. (about minus 17.8° C.). A resultant ceramic material, reaction product, exhibits physical characteristics superior to those of conventional magnesium oxychloride and oxysulfate materials, and may be vacuum-degassed to reduce its viscosity, if desired.

The reaction between the platelet/flake magnesium oxide and the aqueous magnesium salt solution to achieve the desired ceramic material is carried out under low shear conditions. Quite surprisingly, it has been found that vigorous blending conditions are not necessary when using the platelet/flake magnesium oxide of the invention, which is in stark contrast to prior conventional techniques which required at least some form of high shear blending to de-agglomerate and de-flocculate conventional magnesium oxide and disperse the oxide throughout the magnesium salt solutions. Due in part to the physical structure characteristic of the magnesium oxide specified by the present invention, there is no need to de-agglomerate or de-flocculate the oxide. As noted above, it is believed that the platelet/flake magnesium oxide has a natural tendency to form a superior and more complete bond with the magnesium salt. Additionally, it has been found that vigorous blending techniques are not necessary despite the use of magnesium salt solutions having a higher specific gravity than those used in conventional processes.

Due to the excellent bonding characteristics of the platelet/flake magnesium oxide and salt according to the invention, there is little to no need for conventional phosphate additives typically used to enhance characteristics of the formed reaction product. In fact, it is believed that the presence of such phosphates may act to the detriment of the reaction product yield. It is believed that the presence of such phosphates may interfere with, and/or prevent, the molecular bonding between the oxide and the salt.

The inventive ceramic material has a number of uses such as, for example, high strength, water insoluble, and low viscosity articles. Additionally, the inventive material is especially useful as a cement. The preferred cements have a magnesium oxysulfate system of $5MgO.MgSO_4.8H_2O$ and a magnesium oxychloride system of $5MgO.MgCl_2.9H_2O$, both of which are water-insoluble and neither of which contain the type of magnesium oxide having a tendency to hydrate to undesired, water-insoluble magnesium hydroxide.

A preferred method of making the inventive magnesium oxychloride or oxysulfate ceramic material includes the steps of preparing a magnesium salt solution, such as magnesium sulfate. Preferably about 300 parts by weight (pbw) to about 350 pbw water are blended with about 600 pbw to about 650 pbw magnesium sulfate hydrate ($MgSO_4.7H_2O$) at room temperature. The magnesium sulfate hydrate may be solubilized more rapidly at an elevated temperature in a range of about 120° F. (about 49° C.) to about the boiling point of the solution (e.g., about 254° F.

(about 123 ° C.)). Once the magnesium sulfate hydrate is sufficiently solubilized, the platelet/flake magnesium oxide is admixed. Alternatively, a magnesium chloride solution may be prepared by preferably by blending about 300 pbw to about 350 pbw water with about 600 pbw to about 650 pbw magnesium chloride hydrate ($MgCl_2.6H_2O$) at room temperature. The magnesium chloride hydrate may be solubilized more rapidly at a temperature in a range of about 120° F. (about 49° C.) to about the boiling point of the solution (e.g. about 254° F. (about 123 ° C.)). Once the magnesium chloride hydrate is sufficiently solubilized, the platelet/flake magnesium oxide is admixed.

Generally, however, the salt solution includes about 50 wt. % to about 85 wt. % magnesium salt based on the total weight of the solution, and more preferably about 65 wt. % to about 75 wt. % magnesium salt based on the total weight of the solution, the balance being water. Furthermore, a molar ratio of the platelet/flake magnesium oxide to the hydrated magnesium salt (i.e., $MgSO_4.7H_2O$ or $MgCl_2.6H_2O$) is about 5:1 to about 8:1, preferably about 6:1 to about 7:1, and more preferably about 6:1.

As previously noted, a chemical reaction occurs between the salt and oxide ions. Generally, the greater the concentration of the solution, the faster the speed of the reaction, and presumably the more complete the reaction. Furthermore, because the platelet/flake magnesium oxide is soluble in the magnesium sulfate hydrate solution, the more highly concentrated the solution (i.e., the higher the concentration of $MgSO_4$ or $MgCl_2$ in the solution), the more soluble the platelet/flake magnesium oxide within the magnesium oxysulfate system ($5MgO.MgSO_4.8H_2O$) or the magnesium oxychloride system ($5MgO.MgCl_2.9H_2O$). In other words, as the water content is decreased, so too is the likelihood that the reaction will yield an undesirable hydroxide.

While the above reactions yield the desired water-insoluble magnesium oxysulfate and magnesium oxychloride, both of which cure in air to a ceramic material, the reactions also may yield trace amounts of additional products such as, for example, $MgSO_4.6H_2O$ and $3MgO.MgSO_4.11H_2O$ in the case of magnesium oxysulfate. The resultant ceramic material even with the additional products, however, is insoluble in water and exhibits physical characteristics superior to those encountered in the prior art which often yielded water-soluble sulfated magnesium hydroxide. The curing step may be carried out either at room temperature or at an elevated temperature. However, if the curing step is carried out at an elevated temperature, the vapor pressure of the curing material preferably should be maintained at about the same pressure as the surrounding air.

The cured products of the reaction are useful in a variety of contexts such as, for example, as decorative coverings for walls, floors, and ceilings, and as a binder in the formulation of precasting or structural building panels, wherein the casts or panels include one or more fillers, such as wood chips, saw dust, excelsior, straw, wood fibers, glass fibers, and other fibrous materials. Additionally, cured products of the reaction may be foamed by the incorporation of various known materials for use as structural building materials to provide an insulating-type foamed panel having excellent strength characteristics.

Yet another use for the reaction product, in a pre-cured state, is as an additive in a paint or a protective coating for walls, floors, and ceilings. One or more fillers, such as asbestos (e.g., crocidolite, crysotile), boron, carbon chips, carbon powder, cristobalite, dolomite, fiberglass (e.g., chopped fiberglass or fiberglass mats), fly ash, lechatelierite, limestone, mica, natural fibers, opal, perlite, polyacrylate, polyaramide, polyester, polyethylene, polypropylene, quartz, rocks, sawdust, silicon dioxide, steel (e.g., stainless or high-tensile), styrene-acrylonitrile copolymer, tridymite, wood chips, wood fibers, and mixtures thereof, may be added to a slurry of the magnesium oxide and the magnesium salt. Natural fibers include, but are not limited to, wood cellulose, sisal, coir (coconut), bamboo, jute, kenaf, akwara, and elephant grass.

Addition of the particular filler to the slurry, as opposed to dry blending all of the materials prior to the addition of the salt solution and/or water, results in a more effective attachment and binding of the filler to the magnesium oxide and magnesium salt solution. This desirable effect may be attributed to the absorption of magnesium salt into the filler material. Styrene-acrylonitrile copolymer may be blended with the slurry in an amount of about 0 wt. % to about 2 wt. %, based on the weight of the slurry. Perlite may be blended with the slurry in an amount of about 0 wt. % to about 15 wt. %, based on the weight of the slurry. Fly ash may be blended with the slurry in an amount of about 0 wt. % to about 30 wt. %, based on the weight of the slurry. Silicon dioxide (silica) in the form of sand (e.g., FA2-grade sand), for example, limestone, rocks, boron, cristobalite, lechatelierite, tridymite, opal, and quartz, also may be blended with the slurry in an amount of about 0 wt. % to about 150 wt. %, based on the slurry. Chopped fiberglass may be blended with the slurry in an amount of about 0 wt. % to about 25 wt. %, based on the weight of the slurry. Coarse or fine dolomite may be blended with the slurry in an amount of about 0 wt. % to about 30 wt. %, based on the weight of the slurry. Sawdust may be blended with the slurry in an amount of about 0 wt. % to about 15 wt. %, based on the weight of the slurry.

Additionally, a thin film of a coating containing the reaction product provides a protective covering resistant to water damage and fire. The use of the reaction product in a protective coating is quite suitable where light transmission is desired since the product is translucent to transparent.

EXAMPLES

The following non-limiting examples are provided to illustrate the invention but are not intended to limit the scope thereof

Example 1

Tests were performed to determine a suitable concentration range of platelet/flake magnesium oxide in a hydrated magnesium sulfate solution.

A 65 wt. % solids solution of hydrated magnesium oxysulfate ($MgSO_4.7H_2O$) was prepared by mixing 650 grams of hydrated magnesium oxysulfate in 0.35 liters of water. It was determined that the hydrated magnesium sulfate could be solubilized at room temperature and rapidly solubilized at a temperature of about 120° F. (about 49° C.) to about 254° F. (about 123° C.), the boiling point of the solution. While the solids concentration in a given solution can vary between about 50 wt. % to about 75 wt. %, a 65 wt. % solids concentration solution was used in each test.

In a first test, about 650 grams of the platelet/flake magnesium oxide were admixed into the hydrated magnesium oxysulfate solution, which corresponded to a molar ratio of $MgO:MgSO_4.7H_2O$ of about 5:1. The solution containing the platelet/flake magnesium oxide was then cured at a temperature of about 23 ° F. (about minus 5° C.) for about 5 minutes until a cement material formed. The formed cement material contained trace amounts of $MgO:MgSO_4.6H_2O$ and $3MgO.MgSO_4.11H_2O$. Nonetheless, in each test, the formed material proved to be water-insoluble when subjected to a "Forests Products Accelerated Aging Test," wherein the material was exposed six times to the following cycle of test conditions:

(a) 1 hour immersion in 122° F. (50° C.) water;
(b) 3 hours exposure to steam spray at 194° F. (90° C.) to 208° F. (98° C.);
(c) 20 hours exposure to 10° F. (minus 12° C.) air;
(d) 3 hours exposure to 212° F. (100° C.) air;
(e) 3 hours exposure to steam spray at 104° F. (40° C.) to 208° F. (98° C.); and
(f) 18 hours exposure to 212° F. (100° C.) air.

The following molar ratios were tested: 5:1, 6:1, 7.47:1, and 4.62:1. Generally, it was determined that the formed material in each test had superior physical properties compared to a similarly formed product using conventional magnesium oxide. Based on the molar ratios tested, it was determined that a molar ratio of about 6:1 was most preferred, because of the product cost to performance ratio, better viscosity, and lower amounts of heat generated.

Example 2

Tests were performed to determine a suitable concentration range of platelet/flake magnesium oxide in a hydrated magnesium chloride solution.

A 65 wt. % solids solution of hydrated magnesium chloride ($MgCl_2.6H_2O$) was prepared by mixing 650 grams of magnesium chloride hexahydrate in 0.35 liters of water. It was determined that the hydrated magnesium chloride could be solubilized at room temperature and rapidly solubilized at a temperature of about 120° F. (about 49° C.) to about 254° F. (about 123 ° C.), the boiling point of the solution. While the solids concentration in a given solution can vary between about 50 wt. % to about 60 wt. %, a 85 wt. % solids concentration solution was used in each test.

In a first test (Test A), about 650 grams of the platelet/flake magnesium oxide were admixed into the hydrated magnesium chloride solution, which corresponded to a molar ratio of $MgO:MgCl_2.6H_2O$ of about 5:1. The solution containing the magnesium oxide was then cured at a temperature of about 150° F. (about 65.5° C.) for about 15 minutes until a cement material formed. Table I below sets forth the cure conditions and composition of the material made in each test (Tests A-C).

TABLE I

| Test | Molar Ratio of $MgO:MgCl_2.6H_2O$ | Wt. % Solids in hydrated solution of $MgCl_2.6H_2O$ | Cure Time (min) | Cure T (° F.) |
|---|---|---|---|---|
| A | 5:1 | 65 | 15 | 150 |
| B | 6:1 | 77 | 15 | 150 |
| C | 7:1 | 89 | 15 | 150 |

In each of the tests, the formed cement material evolved very little heat which is evidence that none of the platelet/flake magnesium oxide was converted to magnesium hydroxide. Furthermore, the formed material contained little or no free chloride ions. Additionally, when subjected to the water test (the "Forests Products Accelerated Aging Test" described in Example 1), the material did not undesirably hydrolyze to produce a free magnesium chloride known to have a corrosive effect on metals.

Generally, it was determined that the formed material in each test had superior physical property data compared to a similarly formed product using conventional magnesium oxide. Based on the molar ratios tested, it was determined that a molar ratio of about 6:1 was most preferred, because of the product cost to performance ratio, better viscosity, and lower amounts of heat generated.

Example 3

A 65 wt. % solids solution of hydrated magnesium chloride ($MgCl_2.6H_2O$) was prepared by mixing 650 grams of magnesium chloride hexahydrate in 0.35 liters of water. Thereafter, about 650 grams of the platelet/flake magnesium oxide were admixed into the hydrated magnesium chloride solution, which corresponded to a molar ratio of $MgO:MgCl_2.6H_2O$ of about 5:1. The solution containing the platelet/flake magnesium oxide was then cured at a temperature of about 72° F. (about 22° C.) for about 24 hours until a cement material formed. Table II, below, sets forth the compression strength, the modulus of rupture (MR), and the modulus of elasticity of the formed material.

TABLE II

| Physical Property | Test Method | Property Value |
|---|---|---|
| Compression Strength (Dry) (psi) | ASTM D-638 | 11,441 |
| Compression Strength (Wet*) (psi) | ASTM D-638 | 11,000 |
| Modulus of Rupture (Dry) (psi) | ASTM D-790 | 2,900 |
| Modulus of Rupture (Wet*) (psi) | ASTM D-790 | 3,200 |
| Modulus of Elasticity (Dry) (psi) | ASTM D-638 | 6,400,000 |
| Modulus of Elasticity (Wet*) (psi) | ASTM D-638 | 7,210,000 |

Wet* = submerged in water for about 48 hours.

Various formulations of magnesium oxychloride were prepared and cured, the cured materials having different molar ratios of platelet/flake MgO, $MgCl_2.6H_2O$, and $H_2O$. Water bath activity (WBA) and modulus of rupture (MR) were measured (psi) and the results are provided in Table III, below. The modulus of rupture reported in Table III was measured according to ASTM D-790 under the following three different conditions: (a) under dry conditions, (b) after immersing the formed material in boiling water for two hours, and (c) after immersing the formed material in boiling water for 48 hours.

TABLE III

| Molar Ratio of $MgO:MgCl_2.6H_2O:H_2O$ | WBA | MR (a) | MR (b) | MR (c) |
|---|---|---|---|---|
| 5:1:9 | 80 | 4410 | 1640 | 3150 |
| 5:1:9.5 | 62 15 | 4680 | 5500 | 7716 |
| 5:1:10 | 51 50 | 6290 | 4850 | 7000* |
| 6:1:10 | 43 20 | 6660 | 7180 | 7000* |
| 7:1:10 | 32 00 | 8212 | 7400 | 8000* |
| 8:1:10 | 32 43 | 9520 | 4448 | 5760* |
| 8:1:11 | 26 37 | 8260 | 7520 | 6680* |

*= A five day post cure was not enough since the boiling water continued to cure the material.

Example 4

Tests were performed to prepare a fiberglass wall panel having the inventive magnesium oxychloride and to determine its physical characteristics.

A hydrated magnesium chloride solution was prepared by mixing magnesium chloride hexahydrate and water. The concentration of the magnesium chloride hexahydrate varied from 60 wt. % (Test D) to 70 wt. % (Test F). In a first test (Test D), about 650 grams of the platelet/flake magnesium oxide were admixed into the hydrated magnesium chloride solution. About one-half of the solution containing the magnesium oxide was then poured into a mold defined by a metal die. A fiberglass mat was placed atop the poured solution in the mold, and then the remaining half of the solution was poured atop the mat in the mold.

The solution and mat were pressed in the mold at a temperature of about 150° F. (about 65.5° C.) for about 15 minutes. The press was opened and the formed panels were removed and subjected to rupture tests performed according to ASTM D-790 under the following three different conditions: (a) under dry conditions, (b) after immersing the formed material in boiling water for two hours, and (c) after immersing the formed material in boiling water for 48 hours. See Table IV, below, for the results of the rupture tests.

TABLE IV

| Test | Concentration of $MgCl_2.6H_2O$ (%) | Amount of MgO (grams) | MR (a) | MR (b) | MR (c) |
|---|---|---|---|---|---|
| D | 60 | 650 | 11,900 | 11,000 | 15,300 |
| E | 65 | 650 | 15,800 | 20,800 | 16,490 |
| F | 70 | 700 | 15,700 | 22,000 | 23,400 |

A two hour post cure was not enough since the boiling water continued to cure the material.

Example 5

Test were performed to determine curing conditions for a fiberglass reinforced laminate prepared with the inventive magnesium chloride material and the physical properties of the resultant laminate.

A hydrated magnesium chloride solution was prepared by mixing magnesium chloride hexahydrate and water. The concentration of the magnesium chloride hexahydrate was about 65 wt. % based on the weight of the solution. In each test, about 650 grams of the platelet/flake magnesium oxide were admixed into the hydrated magnesium chloride solution. About one-half of the solution containing the platelet/flake magnesium oxide was then poured into a mold defined by a metal die. A fiberglass mat was placed atop the poured solution in the mold, and then the remaining half of the solution was poured atop the mat in the mold.

In a first set of tests (Test G-L in Table V below), the solution and mat were pressed in the mold at various temperatures for various times. The press was opened and the formed panel was removed and subjected to rupture tests performed according to ASTM D-790 under the following three different conditions: (a) under dry conditions, (b) after immersing the formed material in boiling water for two hours, and (c) after immersing the formed material in boiling water for 48 hours.

TABLE V

| Test | Temp (° F.) | Time (min) | MR (a) | MR (b) | MR (c) |
|---|---|---|---|---|---|
| G | 78 | 1440 | 19,100 | 15,900 | 15,750 |
| H | 150 | 75 | 17,900 | 15,750 | 13,450 |
| I | 200 | 15 | 17,150 | 13,800 | 11,320 |
| J | 230 | 5 | 17,800 | 12,600 | 14,700 |

TABLE V-continued

| Test | Temp (° F.) | Time (min) | MR (a) | MR (b) | MR (c) |
|---|---|---|---|---|---|
| K | 250 | 5 | 14,500 | 13,000 | 11,100 |
| L | 300 | 3 | 12,900 | 9,000 | 10,300 |

From the data reported in Table V, above, it is apparent that the formed laminate has a higher modulus of rupture when the laminate is formed by curing at low temperatures and high cure times. However, it is also apparent that short curing times utilizing higher temperatures results in laminates having satisfactory strength characteristics.

Example 6

A mixture containing the inventive magnesium oxychloride material and FA2-grade sand was prepared to determine strength characteristics thereof when exposed to water for prolonged periods of time.

A hydrated magnesium chloride solution was prepared by mixing about 650 grams of magnesium chloride hexahydrate and 0.35 liters of water. About 800 grams of the platelet/flake magnesium oxide were admixed into the hydrated magnesium chloride solution along with about 3,600 grams of FA2-grade sand. The resultant slurry containing the platelet/flake magnesium oxide and FA2-grade sand was then cured at a temperature of about 72° F. (about 22.2° C.) for about 24 hours until a cement material formed. Table VI, below, sets forth the compression strength, the modulus of rupture (MR), and the modulus of elasticity of the formed material exposed to (a) boiling water for 48 hours and (b) room-temperature water for 30 days.

TABLE VI

| Physical Property | Test Method | 48-hrs Boiling Water | 30 Days Room-T |
|---|---|---|---|
| Compression Strength (Dry) (psi) | ASTM D-638 | 11,441 | 11,441 |
| Compression Strength (Wet) (psi) | ASTM D-638 | 11,000* | 11,441‡ |
| Modulus of Rupture (Dry) (psi) | ASTM D-790 | 2,900 | 3,200 |
| Modulus of Rupture (Wet) (psi) | ASTM D-790 | 3,200* | 3,200‡ |
| Modulus of Elasticity (Dry) (psi) | ASTM D-638 | 6,400,000* | 7,210,000 |
| Modulus of Elasticity (Wet) (psi) | ASTM D-638 | 7,210,000* | 7,210,000‡ |

*= submerged in boiling water for about 48 hours
‡= submerged in water at ambient temperature for 30 days It is apparent from data reported in Table VI, above, that the strength characteristics of the formed material are not diminished by water exposure.

Example 7

A supersaturated, hydrated magnesium chloride solution (100 parts by weight) having a specific gravity of 36 Be at 67° F. was combined with 60 parts by weight of a platelet/flake magnesium oxide and mixed to form a slurry mixture. To this mixture was added 13 pbw of 100 bc ("before coupling") perlite and hand-mixed until all of the perlite was thoroughly mixed with the slurry. The final texture of the mixture containing the three components was similar to a pancake batter mix. The mixture was then poured into a cylinder (three inches in diameter and six inches in height).

Figure 1:
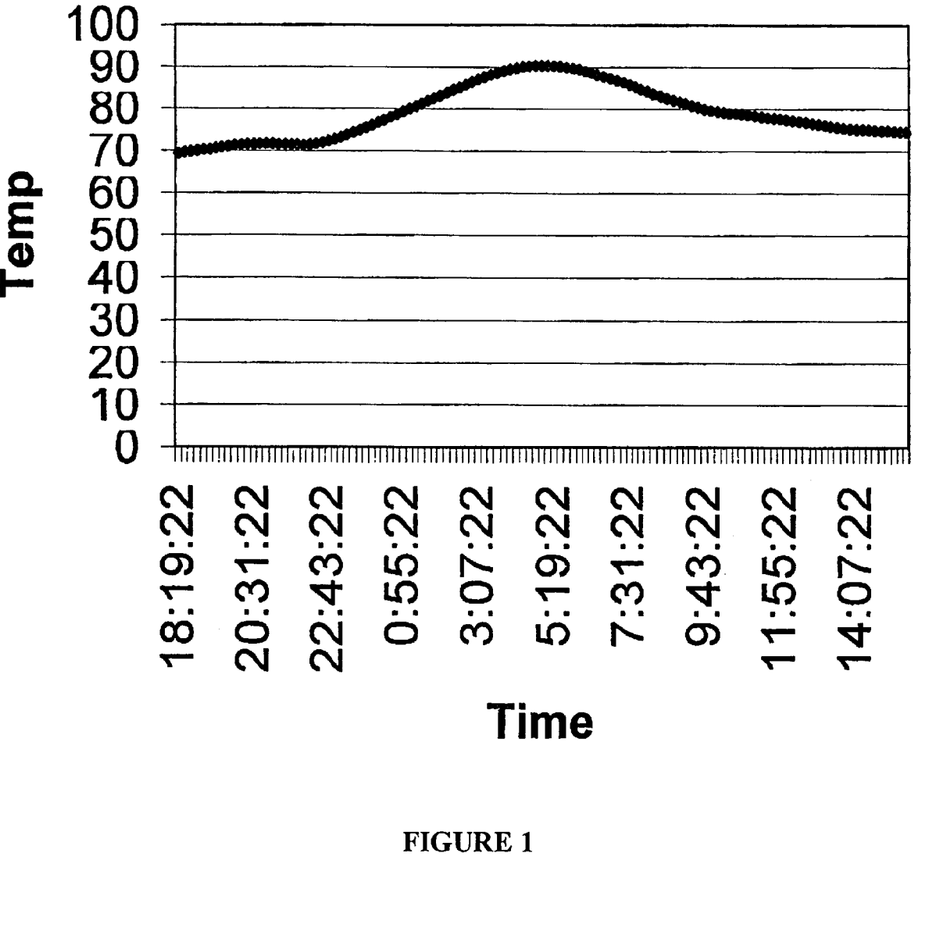
FIG. 1 is a graph depicting the cure time and temperature evolved during the cure of a slurry containing a platelet/flake magnesium oxide; and, FIG. 2 is a graph depicting the cure time and temperature evolved during the cure of a slurry containing a conventional magnesium oxide.

A temperature probe was inserted into the mixture within the cylinder to measure the heat evolved at 11 minute intervals. FIG. 1 is a graph of slurry temperature versus time.

Once the slurry had fully cured within the cylinder, the cylinder was subjected to a compression test. Pressure was applied until such time as the cylinder fractured and broke apart. The pressure necessary to cause the cylinder to fracture and break apart was 3,000 psi.

Example 8 (Comparative Example)

This example was conducted to compare the heat evolved by a slurry containing conventional magnesium oxide versus the slurry (Example 7, above) containing a platelet/flake magnesium oxide.

Figure 2:
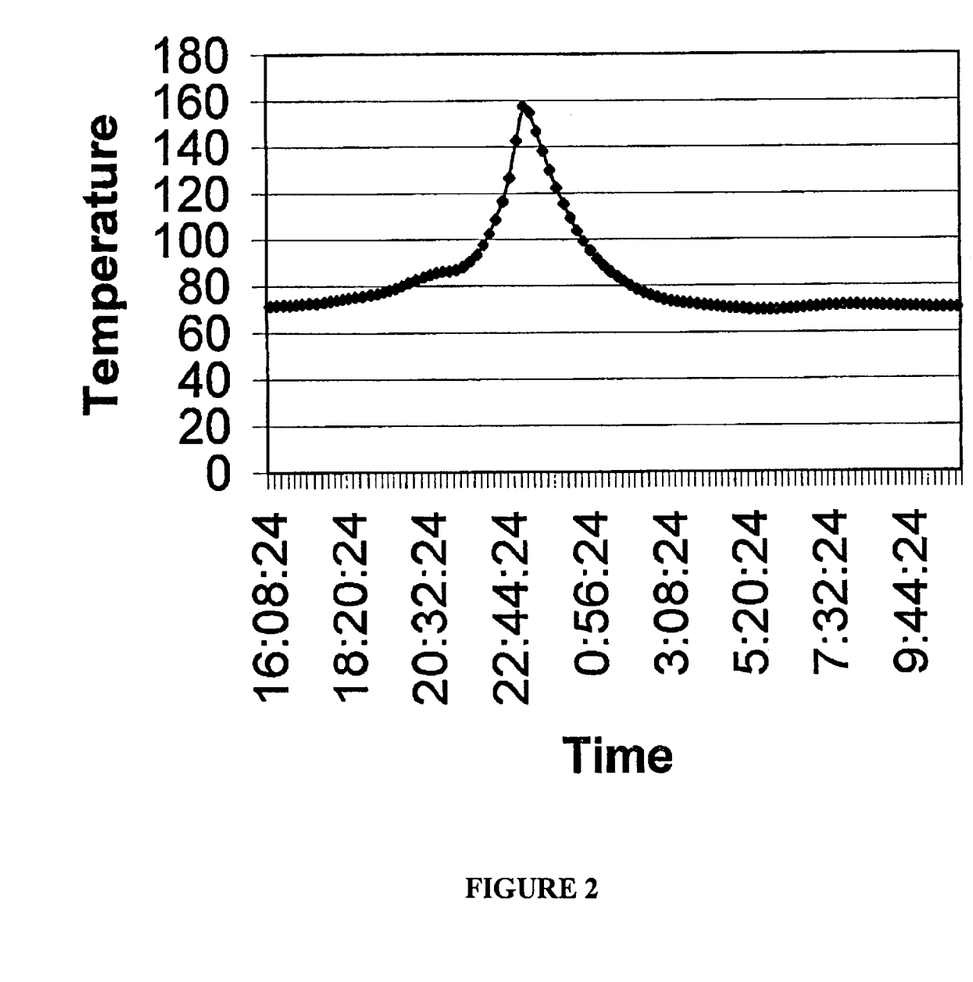

A supersaturated, hydrated magnesium chloride solution (100 parts by weight) having a specific gravity of 36 Be at 67° F. was combined with 60 parts by weight of a conventional magnesium oxide (available from Martin Marietta under the name MAG CHEM 50®) and mixed to form a slurry mixture. To this mixture was added 13 pbw of 100 bc perlite and hand-mixed until all of the perlite was thoroughly mixed with the slurry. The mixture was then poured into a cylinder (three inches in diameter and six inches in height). A temperature probe was inserted into the mixture within the cylinder to measure the heat evolved at 11 minute intervals. FIG. 2 is a graph of slurry temperature versus time.

Once the slurry had fully cured within the cylinder, the cylinder was subjected to a compression test. A pressure was applied until such time as the cylinder fractured and broke apart. The pressure necessary to cause the cylinder to fracture and brake apart was 1,571 psi.

The foregoing description is given for clearness of understanding only, and no unnecessary limitations should be understood therefrom, as modifications within the scope of the invention may be apparent to those skilled in the art.

What is claimed is:

1. A ceramic material comprising a cured reaction product of:
   (a) magnesium oxide having a platelet or flake structure, a bulk density of about 30 lbs/ft$^3$ to about 70 lbs/ft$^3$, and a particle density of about 215 lbs/ft$^3$ or less; and,
   (b) an aqueous solution comprising a magnesium salt selected from the group consisting of magnesium chloride, magnesium sulfate, and mixtures thereof wherein the solution has a specific gravity of about 1.18 to about 1.4, inclusive.

2. The ceramic material of claim 1, wherein the aqueous solution is substantially free of phosphates.

3. The ceramic material of claim 2, wherein the magnesium oxide and the magnesium salt are present in a molar ratio of magnesium oxide to the magnesium salt of about 5:1 to about 8:1, inclusive.

4. The ceramic material of claim 3, wherein the molar ratio is about 6:1 to about 7:1, inclusive.

5. The ceramic material of claim 4, wherein the molar ratio is about 6:1.

6. The ceramic material of claim 2, wherein the magnesium salt solution comprises about 300 parts by weight (pbw) to about 350 pbw water, and about 600 pbw to about 650 pbw magnesium salt hydrate.

7. The ceramic material of claim 2, wherein the magnesium salt hydrate is selected from the group consisting of $MgCl_2.6H_2O$ and $MgSO_4.7H_2O$.

8. The ceramic material of claim 7, wherein the cured reaction product is a cement material selected from the group consisting of $5MgO.MgSO_4.8H_2O$ and $5MgO.MgCl_2.9H_2O$.

9. The ceramic material of claim 2, wherein the magnesium salt solution comprises about 50 weight percent (wt. %) to about 85 wt. % of magnesium salt based on the total weight of the solution, the balance being water.

10. The ceramic material of claim 9, wherein the magnesium salt solution comprises about 65 wt. % to about 75 wt. % of magnesium salt based on the total weight of the solution.

11. The ceramic material of claim 1, wherein the solution further comprises at least one of asbestos, boron, carbon chips, carbon powder, cristobalite, dolomite, fiberglass, fly ash, lechatelierite, limestone, mica, natural fibers, opal, perlite, polyacrylate, polyaramide, polyester, polyethylene, polypropylene, quartz, rocks, sawdust, silicon dioxide, steel, styrene-acrylonitrile copolymer, tridymite, wood chips, wood fibers, and mixtures thereof.

12. The ceramic material of claim 1, wherein the magnesium oxide has a particle density of about 170 lbs/ft$^3$ to about 215 lbs/ft$^3$, inclusive.

13. The ceramic material of claim 12, wherein the magnesium oxide has a particle density of about 190 lbs/ft$^3$ to about 205 lbs/ft$^3$, inclusive.

14. The ceramic material of claim 13, wherein the magnesium oxide has a particle density of about 195 lbs/ft$^3$ to about 200 lbs/ft$^3$, inclusive.

15. A ceramic material made by a method comprising the steps of
   (a) providing an aqueous magnesium salt solution, wherein the magnesium salt is selected from the group consisting of magnesium chloride, magnesium sulfate, and mixtures thereof, the solution having a specific gravity of about 1.18 to about 1.4, inclusive;
   (b) admixing the aqueous solution of step (a), with a magnesium oxide having a platelet or flake structure, a bulk density of about 30 lbs/ft$^3$ to about 70 lbs/ft$^3$, inclusive, and a particle density of about 215 lbs/ft$^3$ or less, to form a slurry; and,
   (c) curing the slurry to form the ceramic material.

16. The ceramic material of claim 15, wherein in step (a) the solution is prepared by blending about 300 pbw to about 350 pbw water, and about 600 pbw to about 650 pbw magnesium salt hydrate.

17. The ceramic material of claim 16, wherein the magnesium salt solution is selected from the group consisting of $MgCl_2.6H_2O$ and $MgSO_4.7H_2O$.

18. The ceramic material of claim 17, wherein the ceramic material is a cement material selected from the group consisting of $5MgO.MgSO_4.8H_2O$ and $5MgO.MgCl_2.9H_2O$.

19. A method of making ceramic material, the method comprising the steps of:
   (a) providing an aqueous magnesium salt solution, wherein the magnesium salt is selected from the group consisting of magnesium chloride, magnesium sulfate, and mixtures thereof, the solution having a specific gravity of about 1.18 to about 1.4, inclusive;
   (b) admixing the aqueous solution of step (a), with a magnesium oxide having a platelet or flake structure, a bulk density of about 30 lbs/ft$^3$ to about 70 lbs/ft$^3$, inclusive, and a particle density of about 215 lbs/f$^3$ or less, to form a slurry; and,
   (c) curing the slurry to form the ceramic material.

20. The method of claim 19, wherein in step (a) the solution is prepared by blending about 300 pbw to about 350 pbw water, and about 600 pbw to about 650 pbw magnesium salt hydrate.

21. The method of claim 20, wherein the magnesium salt solution is selected from the group consisting of $MgCl_2.6H_2O$ and $MgSO_4.7H_2O$.

22. The method of claim 21, wherein the ceramic material is a cement material selected from the group consisting of $5MgO.MgSO_4.8H_2O$ and $5MgO.MgCl_2.9H_2O$.

23. Magnesium oxide having a platelet or flake structure, a bulk density of about 30 lbs/ft$^3$ to about 70 lbs/ft$^3$, inclusive, and a particle density of about 215 lbs/ft$^3$ or less.

24. The magnesium oxide of claim 23, having a particle density of about 170 lbs/ft$^3$ to about 215 lbs/ft$^3$, inclusive.

25. The magnesium oxide of claim 24, having a particle density of about 190 lbs/ft$^3$ to about 205 lbs/ft$^3$, inclusive.

26. The magnesium oxide of claim 25, having a particle density of about 195 lbs/ft$^3$ to about 200 lbs/ft$^3$, inclusive.

27. The magnesium oxide of claim 23 having an iodine number of about 15 to about 60, inclusive.

28. The magnesium oxide of claim 23 having a particle size of about 0.1 microns to about 100 microns, inclusive.

29. The magnesium oxide of claim 28 having a particle size of about 0.1 microns to about 0.3 microns, inclusive.

30. The magnesium oxide of claim 23 having a crystal size of about 0.02 microns to about 0.035 microns, inclusive.

* * * * *